United States Patent
Aleksy et al.

(10) Patent No.: US 9,445,236 B2
(45) Date of Patent: Sep. 13, 2016

(54) RECORDING AND PROCESSING SAFETY RELEVANT OBSERVATIONS FOR FACILITIES

(71) Applicant: ABB TECHNOLOGY AG, Zürich (SE)

(72) Inventors: Markus Aleksy, Ludwigshafen (DE); Bernd Stieger, Plankstadt (DE); Mikko Rissanen, Kungsängen (SE)

(73) Assignee: ABB Schweiz AG, Baden (CH)

( * ) Notice: Subject to any disclaimer, the term of this patent is extended or adjusted under 35 U.S.C. 154(b) by 134 days.

(21) Appl. No.: 14/281,490

(22) Filed: May 19, 2014

(65) Prior Publication Data
US 2014/0342758 A1    Nov. 20, 2014

(30) Foreign Application Priority Data
May 17, 2013   (EP) .................................... 13002616

(51) Int. Cl.
*H04W 4/02*   (2009.01)
*H04W 64/00*   (2009.01)
*G06Q 10/10*   (2012.01)
*G06Q 50/00*   (2012.01)
*H04M 1/725*   (2006.01)

(52) U.S. Cl.
CPC ............. *H04W 4/023* (2013.01); *G06Q 10/10* (2013.01); *G06Q 50/00* (2013.01); *H04M 1/72569* (2013.01); *H04M 1/72572* (2013.01)

(58) Field of Classification Search
CPC ...... H04W 84/18; H04W 4/02; H04M 1/725
USPC .............................................. 455/456.1–457
See application file for complete search history.

(56) References Cited

U.S. PATENT DOCUMENTS

| 6,512,976 B1* | 1/2003 | Sabatino | G01C 21/005 342/357.36 |
| 2009/0131012 A1* | 5/2009 | Ashley, Jr. | G01S 5/0018 455/404.2 |
| 2010/0322124 A1* | 12/2010 | Luoma | H04W 72/1242 370/311 |
| 2012/0264446 A1* | 10/2012 | Xie | G01C 22/00 455/456.1 |

FOREIGN PATENT DOCUMENTS

EP   2 568 266 A1   3/2013

OTHER PUBLICATIONS

European search Report issued in corresponding European Patent Application No. 13002616.4 dated Sep. 20, 2013.

* cited by examiner

*Primary Examiner* — Sharad Rampuria
*Assistant Examiner* — Farideh Madani
(74) *Attorney, Agent, or Firm* — Barnes & Thornburg LLP (57) ABSTRACT

A mobile device has a location sensor and a data sensor for collecting data that relates to technical equipment. An area component determines that the mobile device is located in an event area with the potential of occurrence of events in categories. A detection component processes data from the data sensor that is indicative of events. The detection component is active if the mobile device is located in the event area. A recorder component records data from the data sensor in combination with the geographic location of the mobile device. The recorder component is active if a particular event that falls into at least one of the categories has been detected.

20 Claims, 6 Drawing Sheets

RECORDING AND PROCESSING SAFETY RELEVANT OBSERVATIONS FOR FACILITIES

FIELD

The present disclosure generally relates to data processing, and more particularly relates to data processing for recording and post-processing data from safety and security observations of facilities.

BACKGROUND INFORMATION

Technical equipment that is part of a facility can create potential health risks to persons in that facility or to persons outside the facility. Examples of facilities include plants, factory sites, production facilities, robot cells, workshops, repair shops, computer server farms, hospitals, streets, railway stations, bus terminals, airports and the like. Examples of technical equipment include industrial or agricultural machines, power systems and products (such as transformers, power electronics, industrial robots, drives, generators, motors) measurement products or instruments (such as flow meters), road or rail vehicles, aircraft, transportation means or other physical objects. The technical equipment can cause health risks, for example, by emitting dust, particles, radiation, toxic gases, by heating the environment to extreme cold or hot temperatures, by causing mechanical hazards or otherwise.

Risks are not only directed to persons, but the technical equipment can be at risk itself (damage, destruction, etc.). Also, persons can be a risk to the equipment. In view of that, a terminology differentiation such as into "safety risk" (e.g., to persons) and "security risk" (e.g., from persons) is not required. Risks are omnipresent.

Rules mitigate the risks, for example, by limiting or preventing physical access of persons to the equipment (or to the facility), by demanding warning signs to be displayed, by requiring the persons to wear protective garments, or the like.

In many cases, the facility operators and the persons inside the facility are in an employer-employee relation, for example, in case of factories. In other cases, the facility operators have to deal with persons that belong to the general public, for example, in case of railway stations or airports.

For the mentioned reasons and also for legal reasons, facility operators have to manage the risks. The facility operators set up rules and communicate the rules to the persons in the facility. The facility operators monitor the facility in view of the rules on a regular basis, record compliance and/or non-compliance with the rules, and process the records. Also, the facility operators identify and conduct counter-measures that lead to rule compliance.

For monitoring and recording, the facility operators can use microphones, gas sensors or cameras that are installed in the facility, or the facility operators can dispatch human specialists, so-called inspectors (or auditors, or safety/security experts) to the facilities.

The inspectors monitor the facility in person and record the results on paper in notebooks or questionnaires. The inspectors seek improvements when making the records on portable computers. In such scenarios, media breaks between recording and processing can be avoided. However, for both the paper and the computer approach, record processing is separated by location (facility vs. office) and time (processing time later than recording time). But just replacing paper by portable computers can cause constraints at the technical level. For example, the computer needs user interfaces, the computer communicates data over channels with limited bandwidth, and the computer itself is in constant demand for electrical energy.

SUMMARY

An exemplary embodiment of the present disclosure provides a computer-implemented method for collecting a data set that relates to technical equipment. The exemplary method is implemented with a mobile device that includes a location sensor and a data sensor. The exemplary method includes determining, in at least one hardware processor of the mobile device, that the mobile device is located in an event area being an area in that events originate from the technical equipment in event categories. The exemplary method also includes activating, in the at least one processor, a detection component in the mobile device, the detection component being configured to process data from the data sensor to detect events in the event categories. In addition, the exemplary method includes, upon detecting a particular event that falls into at least one of the event categories, providing the data set with data from the data sensor of the mobile device in combination with the geographic location of the mobile device from the location sensor.

An exemplary embodiment of the present disclosure provides a mobile device which includes a location sensor and a data sensor for collecting data that relates to technical equipment. The exemplary mobile device also includes an area component configured to determine that the mobile device is located in an event area with a potential of occurrence of events in event categories, wherein the events originate from the technical equipment inside the event area. In addition, the exemplary mobile device includes a detection component configured to process data from the data sensor that is indicative of events in the event categories, the detection component being active if the mobile device is located in the event area. Further, the exemplary mobile device includes a recorder component configured to record data from the data sensor of the mobile device in combination with the geographic location of the mobile device, the recorder component being active if a particular event that falls into at least one of the categories has been detected.

An exemplary embodiment of the present disclosure provides a non-transitory computer-readable recording medium having a computer program recorded thereon that causes at least one processor of a mobile device to implement a method for collecting a data set that relates to technical equipment. The mobile device includes a location sensor and a data sensor. The exemplary method includes determining that the mobile device is located in an event area being an area in that events originate from the technical equipment in event categories, and activating a detection component in the mobile device, the detection component being configured to process data from the data sensor to detect events in the event categories. In addition, the exemplary method includes, upon detecting a particular event that falls into at least one of the event categories, providing the data set with data from the data sensor of the mobile device in combination with the geographic location of the mobile device from the location sensor.

BRIEF DESCRIPTION OF DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a computer-implemented method for collecting or gathering a data set that relates to technical equipment, a mobile device, and a non-transitory computer-readable recording medium (a non-volatile memory such as a ROM, hard disk, flash memory, optical memory, etc.) having a computer program recorded thereon that is executed by at least one hardware processor of a computing device.

The computer-implemented method uses a mobile device that has a location sensor and that has a data sensor. In a determining step, the mobile device determines that it is located in an event area. The event area is an area in that events originate from the technical equipment in event categories. In an activating step, a detection component in the mobile device processes data from the data sensor to detect events in the event categories. Upon detecting a particular event that falls into at least one of the categories, the device provides the data set with data from the data sensor of the mobile device in combination with the geographic location of the mobile device.

The mobile device has a location sensor and a data sensor and collects data that relates to technical equipment. In the mobile device, an area component determines that the mobile device is located in an event area with the potential of occurrence of events in event categories. The events originate from the technical equipment inside the event area. A detection component processes data from the data sensor that is indicative of events in the event categories. The detection component is active if the mobile device is located in the event area. A recorder component records data from the data sensor of the mobile device in combination with the geographic location of the mobile device. The recorder component is active if a particular event that falls into at least one of the categories has been detected.

The technical equipment can include equipment that is carried by a person in the facility, such as personal protective equipment, with protective clothing (like gloves), protective headgear (like helmets) and the like.

The approach allows to limit the amount of data to be recorded and hence to be communicated and to be processed by (a) pre-selecting the data sensor for data to be recorded and (b) triggering data recording by detecting events. The mobile device consumes processing resources. Resource consumption can be power consumption (that is related to battery loading cycles), memory consumption (of main memory and of storage memory), bandwidth consumption (to communicate data from the device) etc. By using the disclosure, the resource consumption is optimized to what is actually needed.

Processing data includes pre-processing data to detect events and post-processing data, for example, to evaluate the data and/or to detect trends. Pre-processing requires less resources than post-processing. Pre-processing does not require recording. Pre-processing is performed in a resource-saving approach by the mobile device. Pre-processing is activated only temporarily—depending on the location of the mobile device—to switch on or to switch off the detection component.

Pre-processing is not required all the time. Pre-processing is selected (and de-selected) for particular event categories according to the location of the mobile device. Components that post-process (or evaluate) the recorded data are not required to be executed on the mobile device.

Traditionally, recording and processing data is separated by time and location. For example, the inspector carries the paper records to the office to be evaluated at a substantially later point in time. The new approach allows to perform recording and processing at substantially the same time. The amount of data to be processed is technically limited. That substantially avoids signal delays in communicating to a central computer.

Figure 1:
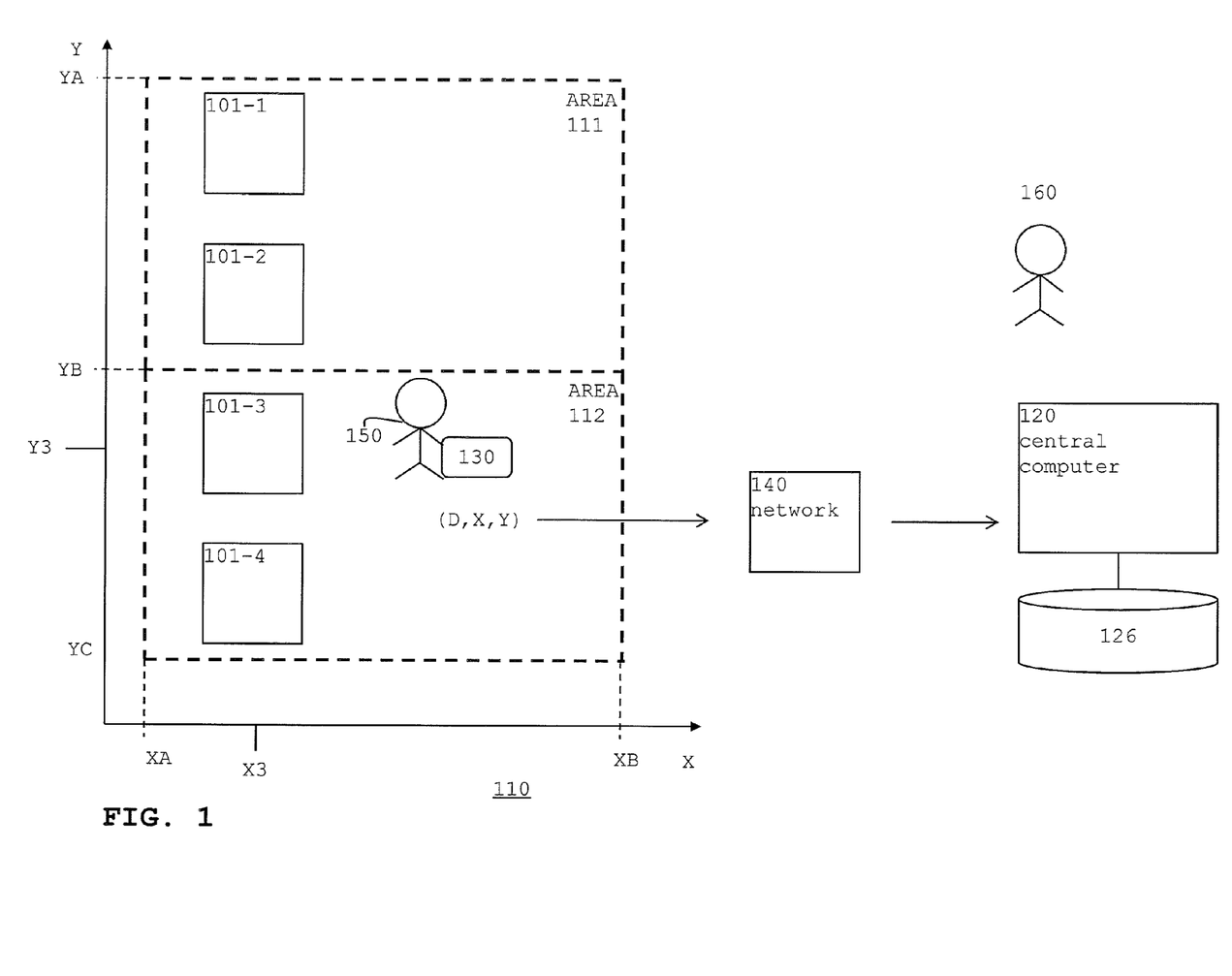
FIG. 1 illustrates an overview of a facility to be inspected.

FIG. 1 illustrates an overview of a facility 110 to be inspected (on the left side of the figure). FIG. 1 also illustrates a central computer 120 (on the right side). Communication network 140 between mobile device 130 and central computer 120 is symbolized in the center.

A geographic coordinate system is indicated for the facility with X coordinates and Y coordinates. Facility 110 has several areas, for example, area 111 illustrated by the rectangle with the corner points (XA,YA), (XB,YA), (XB, YB), (XA,YB); and area 112 illustrated by the rectangle with the corner points (XA,YB), (XB,YB), (XB,YC), (XA, YC). Technical equipment 101-1, 101-2, 101-3, 101-4 are located in areas 111, 112. In more detail, technical equipment 101-1, 101-2 are located in area 111, and technical equipment 101-3, 101-4 are located in area 112. Mobile device 130 can be located in area 111 or in area 112. Inspector user 150 carries mobile device 130 inside the areas and across area boundaries. Mobile device 130 has a location sensor and has a data sensor (details in FIG. 2).

The location sensor determines the (X,Y) coordinates (of the mobile device, e.g., coordinates X3, Y3). An area component in mobile device 130 identifies the area (111 or 112) the inspector is currently visiting and thereby determines that mobile device 130 is located in an area that is classified as an "event area". As used herein, an "event area" is a geographic area in that events originate from the technical equipment 101-1, 101-2, 101-3, 101-4 in event categories. While the mobile device 130 is located inside an event area, mobile device 130 activates a data processing component (cf. a detection component 234 in FIG. 2) to process data from the data sensor to detect events in these event categories. If a particular event is detected that falls into one of the categories, mobile device 130 provides a data set (D, X, Y) with data (D) from the data sensor in combination with the geographic location (X, Y) of mobile device 130.

In the example of FIG. 1, facility 110 can have a pedestrian area (e.g. area 111) and can have a manufacturing hall (e.g. area 112). In both areas, the safety rules are different. To monitor the pedestrian area, inspector user 150 watches for pot-holes and for broken lanterns. In the manufacturing hall, inspector user 150 has a much larger spectrum of signals and signs to see, to hear, to smell and so on. Mobile device 130 with location sensor, data sensor and processing components assists inspector user 150 in the sense that it tracks the location and that it processes visual data (VD), acoustic data (AD) or other data. Mobile device 130 thereby activates components according to location (and de-activates components) and records data in an event-driven approach.

The following example focusses on acoustic signals that potentially result in acoustic data (AD, or "sound samples"). Machines usually expose noise, but the noise can indicate malfunction of the machine. For an inspector, especially a less experienced inspector, the noise might just be a cacophony without any information. However, the detection component is being activated as soon as inspector enters the hall (e.g., event area 112). In this case, the detection component is a digital signal processor (DSP) to processes signals from a microphone (e.g., receives data from the data sensor) to identify particular sound patterns (e.g. events). Such a sound pattern—details in FIG. 3—can be a repetitive "screaming" sound. If such as pattern (e.g. a particular event) is detected, mobile device 130 takes a picture (VD) of the nearby technical equipment (e.g., the machine 101-3), records a sound sample (AD) and adds the location data (Y). More in general, mobile device 130 provides data set (D, X, Y) with data (for example, D=picture VD+sound sample AD) from the data sensor in combination with the geographic location (X, Y).

From a system point of view, two users can be differentiated: the inspector user (150, or "auditor") who operates mobile device 130 at the frontend, and supervisor user 160 who operates central computer 120 (data processing in the backend).

Mobile device 130 can communicate the data set (D, X, Y) to central computer 120. Central computer 120 can be connected to data base 126, for example, to store data or evaluation results. Central computer 120 can be a stationary computer (e.g., a desktop computer) in an office, or can be a computer at a hosting centre (or server farm). Combinations of computers are also possible to use (cf. FIG. 6).

Staying with the example, central computer 120 can evaluate the sound sample AD (or the picture VD) with more sophisticated signal processing techniques. The usage of computer resources is thereby optimized in a balance between (a) pre-processing sound (from the microphone) at mobile device 130 to identify a particular sound pattern and (b) post-processing a recorded sound sample in combination with the picture (VD) and other data to investigate equipment malfunction with more detail.

Since recording (and optionally communicating/transmitting) the data set is governed by the detection of events, the available communication bandwidth (between mobile device 130 and central computer 120) is used efficiently.

In view of the above-mentioned introduction, the communication of rules to the persons in the facility is simplified: inspector user 150 gets the applicable rules activated upon going into event areas (e.g., the manufacturing hall). Recording compliance or (as in the example) non-compliance with the rules is simplified, for example, because:

(a) meta-data such as location is added automatically, and
(b) data is pre-selected based on event category (e.g., sound sample and picture for sound events).

Identifying and conducting counter-measures that lead to rule compliance (e.g., sending a repair team to the machine) can be performed immediately and can be performed by specialists and/or supervisors (that are not necessarily identical with the inspector).

Figure 2:
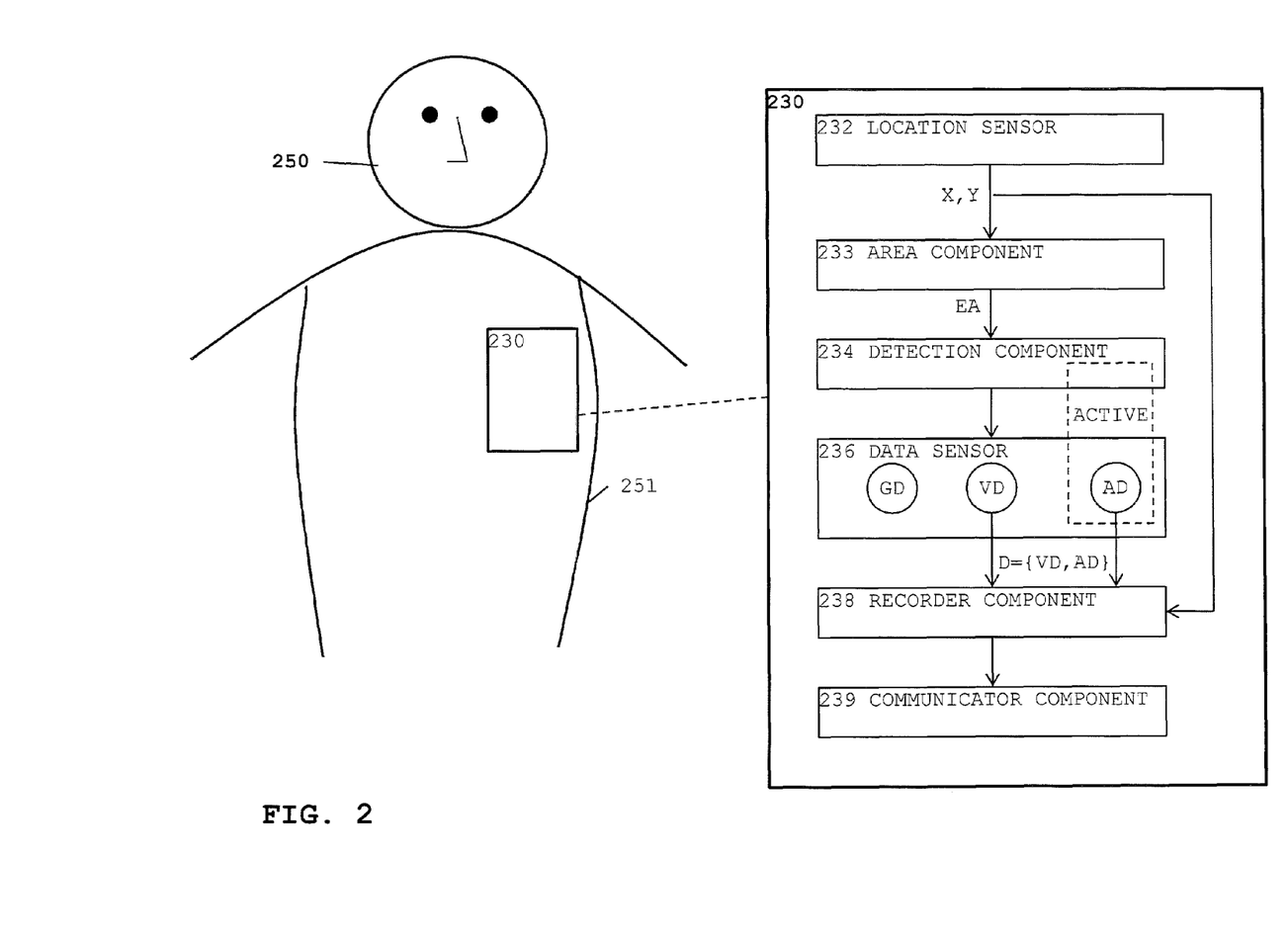
FIG. 2 illustrates a user and a mobile device according to an exemplary embodiment of the present disclosure.

FIG. 2 illustrates user 250 and mobile device 230. In the example, mobile device 230 is connected to clothing 251 of the user. Mobile device 230—or at least parts of the data sensor—could also be mounted on the head of user 250. In that case, the sensor would follow the head movement and would potentially point to technical equipment that the user is looking at. User 250 has the function of the inspector user (cf. FIG. 1) who is going into the event area.

To simplify the illustration, mobile device 230 is shown again on the right side of the figure with more detail. Mobile device 230 has location sensor 232 and data sensor 236. Data sensor 236 collects data that relates to technical equipment. In the example of FIG. 2, data sensor 236 can provide visual data (VD), acoustic data (AD), and chemical data (GD, or "gas data").

Further components of device 230 are area component 233, detection component 234, recorder component 238 and—optionally—communicator component 239. Area component 233 is connected to location sensor 232 and determines that mobile device 230 is located in an event area "EA" (cf. 112) with the potential of occurrence of events in event categories. As mentioned above, the events originate from the technical equipment inside the event area. Detection component 234 processes data (e.g., AD, GD, VD) from data sensor 236 that is potentially indicative of events in the event categories. Detection component 234 is active if mobile device 230 is located inside the event area and is substantially not active when mobile device 230 is located outside the event area. In the example, events are expected to occur in a sound category so that detection component 234 is active for processing acoustic data (AD). In the figure, the specific activation for acoustic data AD is indicated by a dashed frame surrounding a specific part of detection component 234 and a specific part of data sensor 236.

Recorder component 238 records data D from data sensor 236 of mobile device 230 together (e.g. in combination) with the geographic location (X, Y) of mobile device 230 at the time the event was detected. As mentioned, the combination of data D with the location (X, Y) is referred to as "data set".

Recorder component 238 is active if a particular event that falls into one of the event categories has been detected. Recorder component 238 can record data in the category of the event, for example, acoustic data (AD) for sound events. However, recording is not limited to such data. In the example, the event in the mentioned sound category occurs, and—by predefined rules—visual data (VD) and acoustic data (AD) may be recorded.

Communicator component 239 is provided optionally to forward the data set (D, X, Y) (sensor data plus location) to the central computer (cf. FIG. 1).

Figure 3:
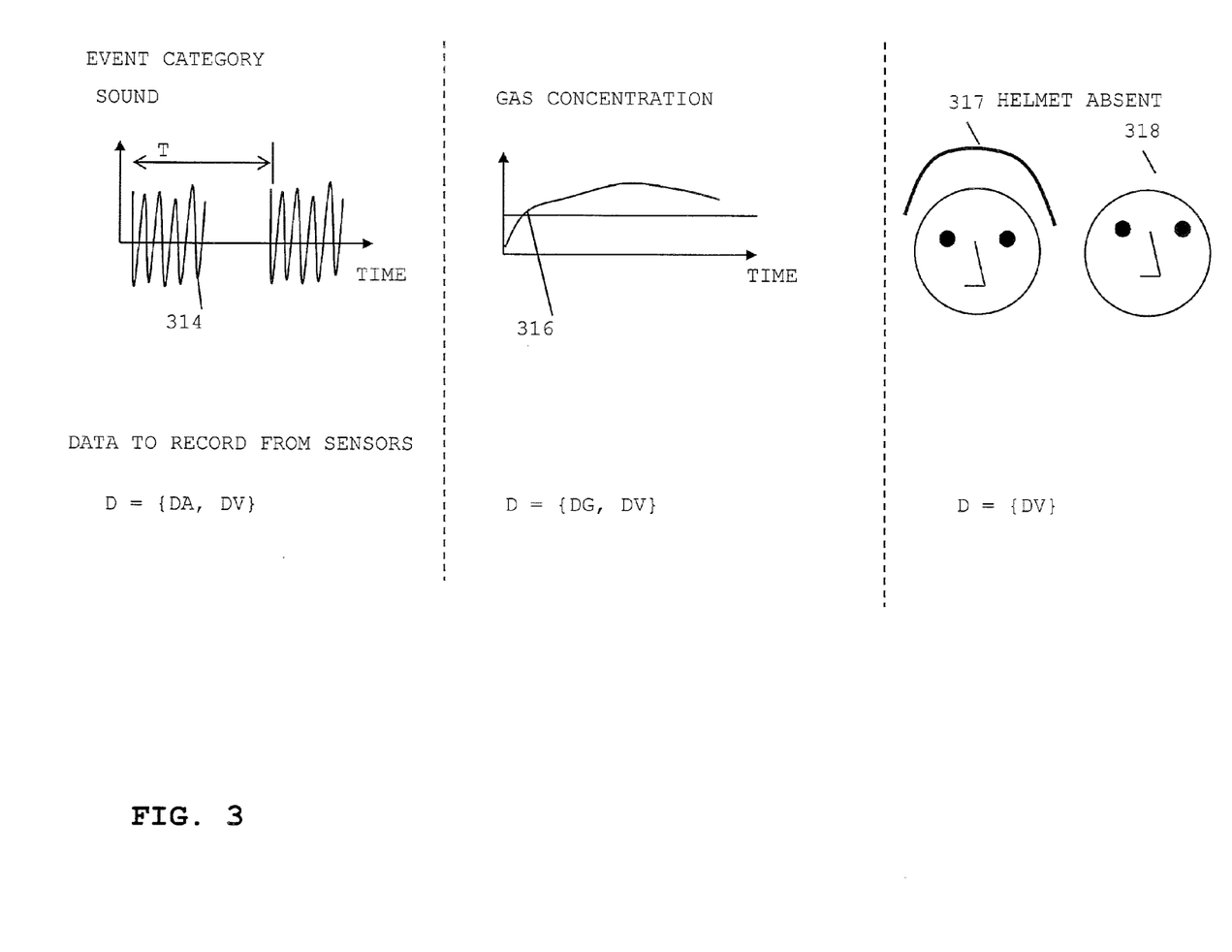
FIG. 3 illustrates examples for events that can occur in an event area according to an exemplary embodiment of the present disclosure.

FIG. 3 illustrates examples for events that can occur in an event area. Such events are identified by the event detection component (cf. FIG. 2, 234) of the mobile device. Most of the components can be implemented by technical means that are usually available in mobile devices known as "Smartphones". The events are illustrated in event categories. The following gives examples. The events can be indicative of risk or of non-compliance with a rule, but this is not required.

In the example, first event category 314 relates to the emission of sound that has two technically distinguishable features:

(a) The sound has a frequency in the range from 10.000 Hz to 20.000 Hz. Sounds with such a high frequency are potentially difficult to hear by humans (e.g., by the inspector user) or can not be heard at all.

(b) The sound is available in repetitions with time intervals of a predefined duration T (e.g., T from 0.05 seconds to 0.2 seconds).

The data processing component can be implemented by digital signal processing (DSP) techniques in hardware or in software. Mobile devices usually do have microphone and DSP often as part of the telecommunication function. A particular event that falls into category 314 can be caused by a machine part that rotates 10 times per second but that for every rotation touches a non-moving part. The rotation results in the time interval (here: T=0.1 seconds); and touching results in the sound.

A second event category 316 may relate to the emission of a gas above a threshold. In the example, the gas concentration gradually increases but passes the threshold.

A third event category 318 may relate to the absence of a particular piece of equipment. For example, a data image (e.g., a picture) can be scanned technically to identify the availability (317) or absence (318) of a protective helmet in the real world. Category 318 relates therefore to the detection that a helmet is missing. Existing face detection techniques can be configured. For example, consumer cameras have a function to detect faces, and such a function can be up-graded (or simplified) to detect the presence or absence of a helmet. To save computation by the mobile device (e.g., consumption of power, memory etc.) there is no need to perform face recognition to identify a particular person by the mobile device. A picture of a particular non-compliant person could be evaluated through recognition by the central computer that has received the data set (D, X, Y). In that scenario the central computer can determine who the person is.

The data D to be recorded in the data set (D, X, Y) is not necessarily corresponding to the data from the data sensor. Further event categories can be introduced. Or, cross-category recording is possible, with detecting an event in a first category (e.g., sound) but recording the data in a second category (e.g., visual).

For example, the event detector can be implemented as a user interface. For example, the inspector user takes textual notes such as "the machine is smoking and evaporating a badly smelling substance". The event detector can process the text to identify keywords like "smoke" or "smell" so that the data sensor is activated in its camera to take a picture (to specify the colour of the substance, and the potentially the size of the smoke). A gas sensor can classify a substance to be a certain chemical substance. In that sense, information is collected by different media (here: text, picture, chemical data) and forwarded for processing as multimedia data.

The selection of data can follow pre-defined collection rules. For example, an event in the first event category can trigger the mobile device to record a sound sample ("acoustic data AD") and to make a visual record ("visual data VD") in form of a picture or a movie. An event in event category 316 can trigger to monitor the gas concentration of the particular gas (e.g., carbon dioxide $CO_2$) and/or of other gases (e.g., carbon monoxide CO) in combination with a picture. The third event category can trigger taking a picture, and—optionally—trigger a user interface action asking the inspector user to note the name of the "no-helmet" person.

Figure 4:
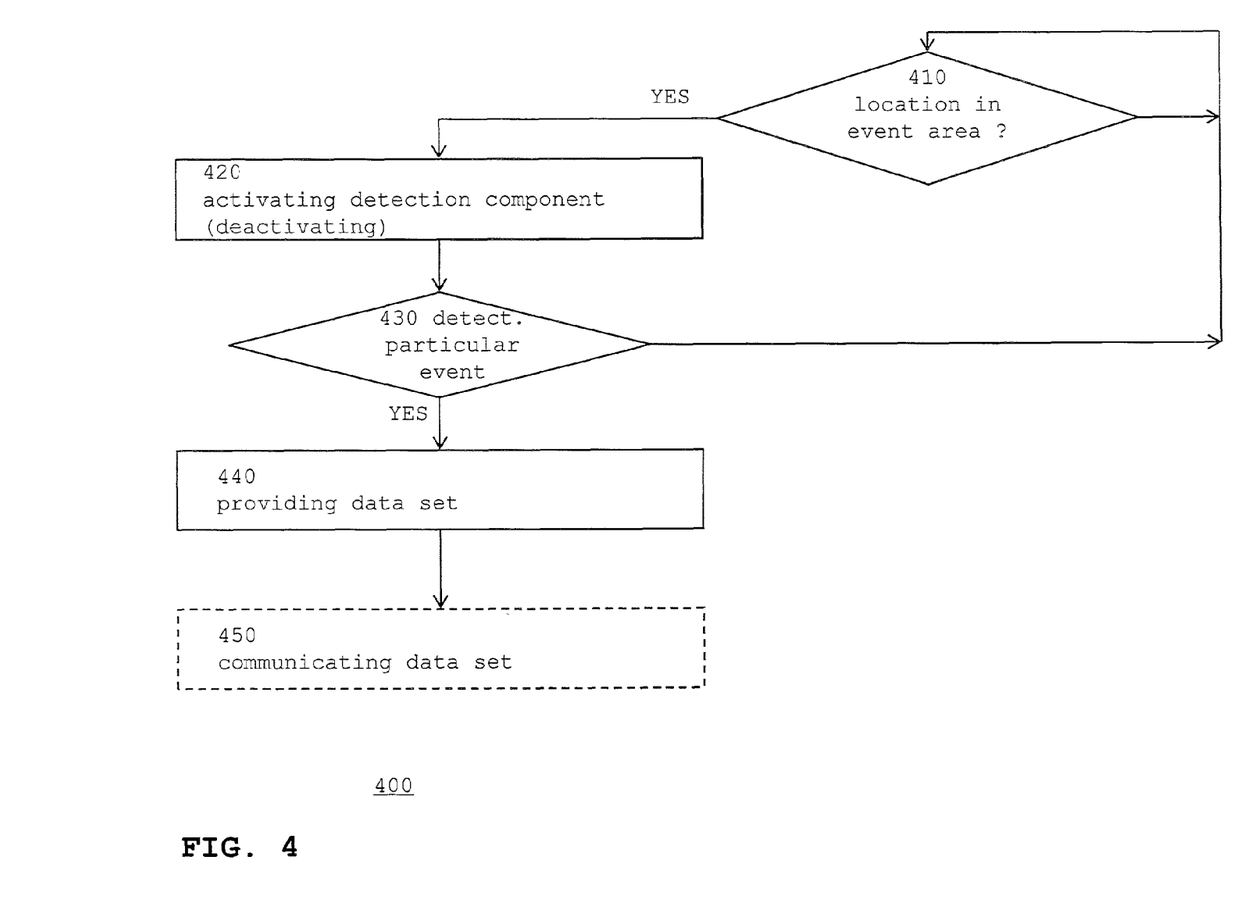
FIG. 4 illustrates a flow chart diagram for a computer-implemented method according to an exemplary embodiment of the present disclosure.

FIG. 4 illustrates a flow chart diagram for computer-implemented method 400 for collecting a data set (D, X, Y) that relates to technical equipment (cf. 101-1, 101-2, 101-3, 101-4). Method 400 uses a mobile device (cf. 130, 230) with a location sensor and with a data sensor. In a determining step 410, the location sensor detects that the mobile device is located in an event area being an area in that events originate from the technical equipment in event categories. In an activating step 420, a detection component in the mobile device is activated to process data (e.g., A, G, V) from the data sensor to detect events in the event categories (vg. 314, 316, 318). Upon detecting 430 a particular event that falls into at least one of the categories, the mobile device provides 440 the data set with data (D) from the data sensor in combination with the geographic location (X, Y).

Optionally, in a communicating step 450, the mobile device communicates the data set (D, X, Y) to a central computer (cf. 120). As described in the example above, the mobile device can be being transported to the event area by a user (e.g. the inspector). In that case, the method can be executed while the mobile device is connected or attached to clothing of the user, or is connected or attached to the head of the user.

Figure 5:
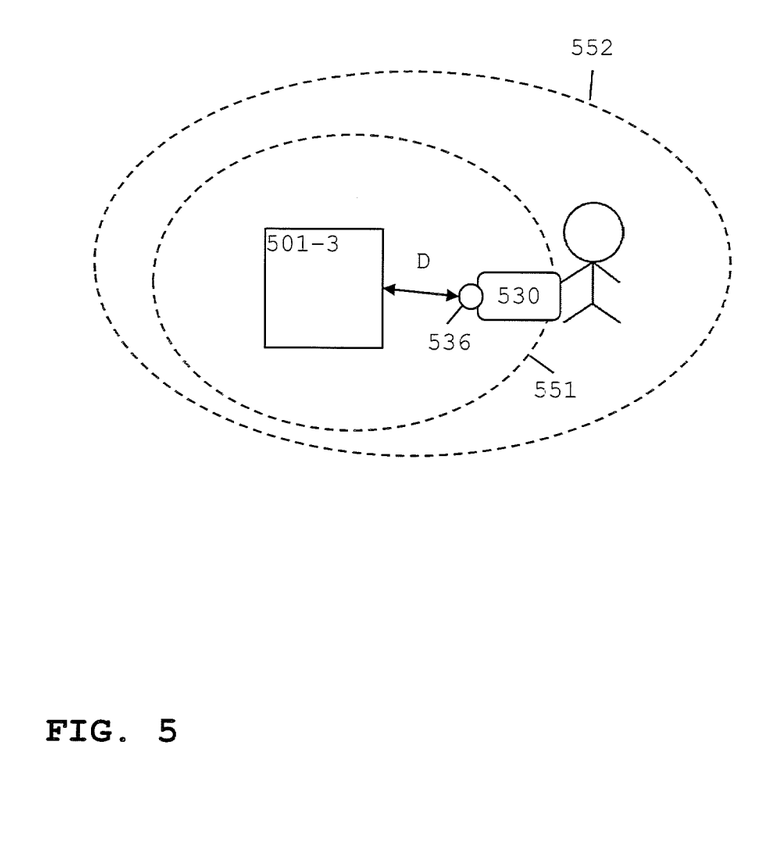
FIG. 5 illustrates further details for the mobile device according to an exemplary embodiment of the present disclosure.

With details outlined above in connection with FIG. 5, providing 440 the data set can depend on a proximity range of the mobile device. The proximity range can be determined by the data resolution of the data sensor in combination with a distance to the technical equipment. The proximity range can be a function of the event category for that the detection component is activated.

Looking at communicating 450 the data set to the central computer, this step can be performed by buffering the data until a connection to the central computer becomes available.

Optionally, the data sets are processed further by the central computer to identify trends, for example to identify trends in rule-compliance or compliance.

FIG. 4 also illustrates a computer program or a computer program product. The computer program product—when loaded into a memory of a computer and being executed by at least one processor of the computer—performs the steps of the computer-implemented method. So in other words, the blocks stand for program modules and illustrate that the method can be implemented by a computer in the mobile device under the control of the program.

Referring back to FIG. 2, the description continues by describing implementation options. Mobile device 230 is basically a portable computer with processor, main memory (e.g., RAM/DRAM memory), storage memory (e.g., a Solid State Drive SSD), and a user interface (e.g., touchscreen or separate keyboard/screen).

In an exemplary embodiment, the mobile device can be implemented by devices that—in marketing terms—are known for example, as smartphone, laptop computer, notebook computer, tablet computer, digital camera, navigation device or similar devices. A smartphone has primarily the function of a voice phone in combination with Internet access. A digital camera has primarily the function of taking pictures, but some digital cameras come to the market with a position sensor (or location sensor).

The person of skill in the art can upgrade the devices, for example, by loading software modules. In case of smartphones, additional functionality can be added by software modules (so-called "Apps") that are downloaded prior to use from a store server. In such a scenario, an "App" could be provided that let the smartphone perform the method.

For location sensor 232, there are many options available. Technologies to obtain location data are commercially available. Location data is also referred to as "position data" or a simply as "position". The data usually consists of latitude and longitude coordinates (cf. X, Y in the example of FIG. 1), but altitude coordinates can be added as well. In the context of facilities, equipment information such as equipment numbers (from an enterprise resource planning system) can be used as well. Satellite positioning systems are usually operated by governmental authorities, for example, the Global Positioning System (GPS) is operated by the United States, Galileo is operated by the European Union and GLONASS is operated by the Russian Federation. Communication systems with a cellular infrastructure (e.g., GSM, UMTS, HSPA, LTE) can also be used to obtain position data. An alternative approach is to identify signals from transmitters at known locations. For example, the signals in wireless local area network (WLAN, or "Wi-Fi", IEEE 802.11) or from near-distance radio (BLUETOOTH) or the like can be applied by triangulation methods.

The hardware (e.g., a GPS receiver) can be part of the device (e.g., as an embedded receiver) and can be external to the device.

It is also possible to determine the location by interacting with the user, for example, by letting the user select a location from a map that is presented on an screen (of the mobile device.)

Not all technologies provide location data everywhere, but multiple technologies can be used in parallel or in alternatives. For example, satellite positioning is usually not available indoors (like in the mentioned manufacturing hall), so that the location sensor losing the satellite signals can automatically switch to a technology with indoor-capability, such as WLAN triangulation.

Area component 233 can be implemented, for example, by software modules that process the location data. Additional information, such as maps or other collections of geographic data of the facility can be used as well.

Detection component 234 can be implemented, for example, by a software module. As mentioned above, component 234 is partly activated (or deactivated). For activating, a module is loaded into the main memory of the processor of the mobile device. A non-activated module does not consume main memory.

Data sensor 236 can be implemented as an on-board data collector that is mounted on the mobile device or that is embedded into the mobile device. Depending on the data to be recorded, data sensor 236 can be an acoustic sensor (or microphone for the sound of the equipment or for voice dictation memos of the inspector), chemical sensor (gas sensor), visual sensor (camera to take images, pictures, videos), vibration sensor, a radiation sensor (or Geiger counter). The data sensor be implemented as a user interface element (like a keyboard or a touchscreen to receive text etc.). The user can input data also by completing a questionnaire. The description has explained the detection component and the data sensor as separate elements, but in particular embodiments, the functions of detecting events and of sensing data can be combined into single elements.

Data sensor 236 can be implemented as a directional sensor. A directional sensor is sensitive in a pre-defined angle and substantially non-sensitive outside the angle. For example, data sensor 236 being a camera can have a typical viewing angle of about 45 degrees. Or, a microphone can be a unidirectional microphone that is sensitive to sounds from substantially only one direction.

Recorder component 238 can be implemented by the storage memory.

Communicator component 239 can include data compression tools to reduce the amount of data to be communicated. In an exemplary embodiment, data communication functionality between mobile device 130 and central computer 120 by communication network 140 can be accomplished by cellular systems (GSM, UMTS, HSPA, LTE). It is also possible to use WLAN. Switching between several physical systems is possible.

FIG. 5 illustrates further details for the mobile device. Proximity range 551 can be determined by the data resolution of data sensor 536 in combination with distance D from data sensor 536 (inherently from mobile device 530) to technical equipment 501-3. In case that data sensor 536 is implemented as a camera, the data resolution may be the pixel resolution of the camera. In case that data sensor 536 is implemented as a microphone, a signal-to-noise ratio (SNR) can be relevant. For example, the distance from the microphone to the equipment is selected such that the sound of the equipment can be distinguished from the background sounds in the facility. In other words, the proximity range can be applied as a further limitation to record data. If mobile device and equipment in relation to each other are positioned outside the proximity range, recording can be avoided, so that data records with insufficient quality for processing do not have to be transmitted to the central computer.

The range can be a function of the event category for that the detection component is activated, for example, sounds may be related to range 552, and pictures or gases may be related to range 551. In the example of FIG. 5, range 552 is larger than range 551. In other words, for the inspector moving with device 550 through the facility to approach equipment 501-3, the microphone would detect the event earlier than the camera.

Figure 6:
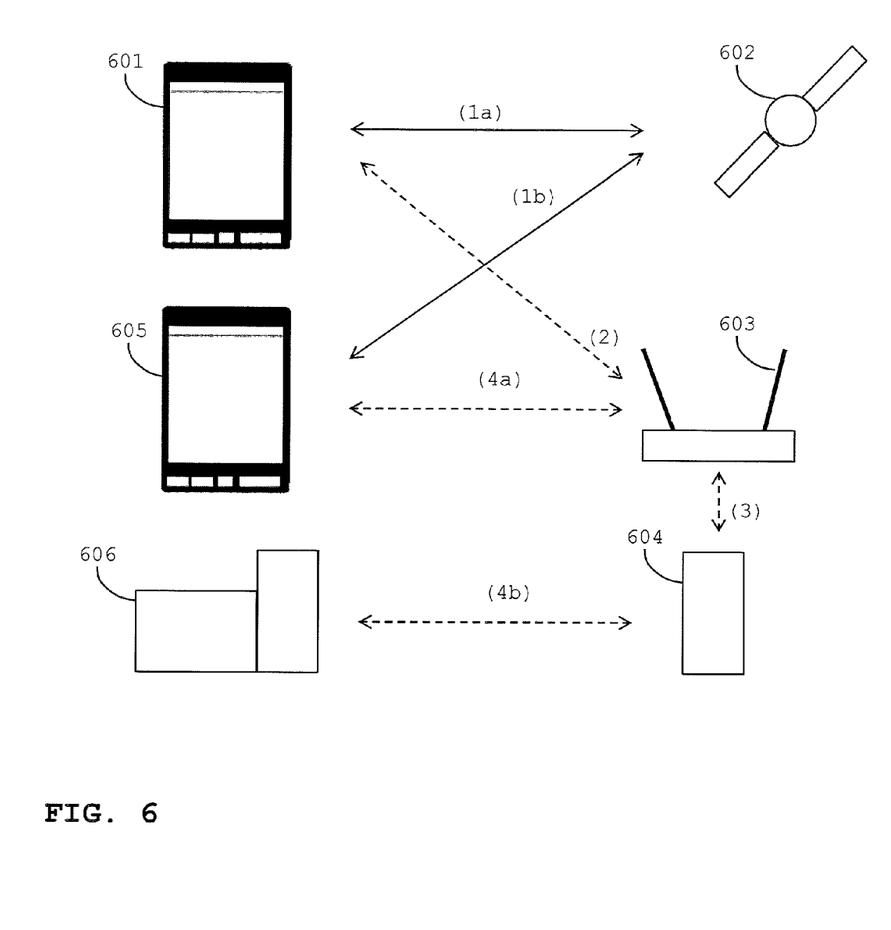
FIG. 6 illustrates further details of the mobile device in combination with a central computer according to an exemplary embodiment of the present disclosure.

FIG. 6 illustrates further details of an exemplary embodiment with the mobile device in combination with a central computer. As illustrated by device 601, a person performing safety observations (cf. inspector user 150/250) is equipped with a wearable/portable computing device (cf. 130/230, hereinafter "computing device") with positioning system and WiFi connectivity, and optionally with a camera and/or an audio-recording unit. The device is used to collect observations, such as safety-related observations. As outlined above with great detail, the observation can include textual descriptions, photos, videos, sounds, the location or positions of the observation, date and time and so on.

Location information (1a)(1b) is obtained automatically via GPS as symbolized by satellite 602 or by GSM/UMTS segments and antennas and/or by WiFi beacon 603 or other beacons.

Device 601 sends safety-related information (2, 3, cf. data sets D in FIG. 1) in combination with the location information via WiFi beacon 603 to a safety information system 604, such as a backend system of the facility operator. Optionally, the computing device can store the information locally and temporality (in a buffer) should the safety observations be made in a disconnected area (without connection to system 604. The information is transmitted to safety information system 604 once a network connection is re-established. Safety information system 604 keeps track of all safety-related information.

As illustrated by device 605, the computing device can be utilized to analyze the safety-related observations on-site (e.g., in the facility) by re-visiting the related locations (4a) and investigating the potential causes. This can be performed by the same physical device of the same inspector user, or by other devices of other users. The previously collected information (2, 3) can be re-loaded from safety information system 604. Optionally, the information is enriched by additional descriptions or multimedia information. For example, the additional descriptions may point to particular equipment that needs a more detailed inspection. In other words, the second inspection (device 605) can be different than the first inspection (601) so that the amount of data to be collected and processed from the second inspection can be less in comparison to the first inspection. Communicating data between the computers and dispatching the inspector can be triggered and controlled by electronic workflows, for example, by workflows in an Enterprise Resources Planning system that is associated with one of the computers.

Optionally, further computer 606 can analyse the safety-related observations (4b). Further computer 605 can be coupled to safety information system 604 to retrieve data, such as information obtained by site visits (cf. 601, 605). Further computer 606 can be a desktop computer installed in an office room, usually, the office of the inspector users. As mentioned, the data sets In other words, data that relates to particular locations can be collected over time so that developments can be discovered. For example, persons in some locations might ignore to wear helmets. The mobile device being carried into such locations (by the inspector) is being activated (cf. processing component 234) to detect persons without helmet. Over time, the location can be identified as a "hot spot", and countermeasures can be taken, for example, to set out instruction signs.

Embodiments of the disclosure can be implemented in digital electronic circuitry, or in computer hardware, firmware, or in combinations of them executing software that is tangibly recorded on a non-transitory computer-readable recording medium, for example, a computer program tangibly embodied in an information carrier, for example, in a machine-readable storage device, for execution by, or to control the operation of, data processing apparatus, for example, a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network before being tangibly recorded on a non-transitory computer-readable recording medium. The described methods can all be executed by corresponding computer products on the respective devices, for example, the first and second computers, the trusted computers and the communication means.

Method steps of the disclosure can be performed by one or more programmable processors, which are hardware components, executing a computer program to perform functions of the present disclosure by operating on input data and generating output, where the computer program is tangibly recorded on a non-transitory computer-readable recording medium, such as a ROM, hard disk, flash memory, optical memory, etc. Method steps can also be performed by, and an apparatus of the present disclosure can be implemented as, special purpose logic circuitry, for example, a field programmable gate array (FPGA) or an application-specific integrated circuit (ASIC).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, optical disks or solid state disks. Such storage means may also provisioned on demand and be accessible through the Internet (e.g., Cloud Computing). Information carriers suitable for embodying computer program instructions and data include all forms of non-volatile memory, including by way of example semiconductor memory devices, for example, EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosure can be implemented on a computer having a display device, for example, a cathode ray tube (CRT) or liquid crystal display (LCD) monitor, for displaying information to the user and an input device such as a keyboard, touchscreen or touchpad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the disclosure, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

The computing system can include clients and servers. A client and a server are generally remote from each other and typically interact through a communication network. The relationship of client and server arises by virtue of computer programs running on the respective computers and having a client-server relationship to each other.

The present disclosure also includes any combination of exemplary embodiments as well as individual features and developments provided they do not exclude each other.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A computer-implemented method for recording a data set that relates to safety and security observations of technical equipment that is part of a facility, the method being implemented with a mobile device that includes a location sensor and a data sensor, the method comprising:

determining, in at least one hardware processor of the mobile device, that the mobile device is located in an event area being a geographic area of the facility inside which events originate from the technical equipment in event categories, wherein the event categories relate to one or more of: an emission of gas above a threshold, an absence of a particular piece of equipment, or an emission of sound within a given frequency range or in repetitions with time intervals of a predefined duration;

activating, in the at least one processor, a detection component in the mobile device, the detection component being configured to process data from the data sensor to detect at least one event that falls into at least one of in the event categories, wherein an event is indicative of a risk or non-compliance with a rule; and upon detecting the at least one event that falls into at least one of the event categories, providing to a second processor, a data set with data from the data sensor of the mobile device in combination with a geographic location of the mobile device from the location sensor for recording of the data set, wherein the providing of the data set depends on a proximity range of the mobile device so that if the mobile device and the technical equipment are positioned in relation to each other outside the proximity range the recording is avoided, with the proximity range being a function of the event category for which the detection component is activated, or being determined by data resolution in combination with a distance from the data sensor to the technical equipment or by a signal-to-noise ratio of the data sensor.

2. The method according to claim 1, comprising:
communicating the data set to a central computer.

3. The method according to claim 1, comprising:
transporting the mobile device to the event area by a user.

4. The method according to claim 3, wherein the method is executed while the mobile device is at least one of connected to clothing of the user, and connected to the head of the user.

5. The method according to claim 1, wherein the providing of the data set depends on a proximity range of the mobile device.

6. The method according to claim 5, wherein the proximity range is determined by a data resolution of the data sensor in combination with a distance to the technical equipment.

7. The method according to claim 6, wherein the proximity range is a function of the event category for which the detection component is activated.

8. The method according to claim 5, wherein the proximity range is a function of the event category for which the detection component is activated.

9. The method according to claim 2, wherein the communicating of the data set to the central computer is performed by buffering the data until a connection to the central computer becomes available.

10. The method according claim 2, comprising:
processing further data sets by the central computer to identify trends.

11. The method according to claim 2, comprising:
transporting the mobile device to the event area by a user.

12. The method according to claim 11, wherein the method is executed while the mobile device is at least one of connected to clothing of the user, and connected to the head of the user.

13. The method according to claim 2, wherein the providing of the data set depends on a proximity range of the mobile device.

14. The method according to claim 13, wherein the proximity range is determined by a data resolution of the data sensor in combination with a distance to the technical equipment.

15. The method according to claim 14, wherein the proximity range is a function of the event category for which the detection component is activated.

16. A mobile device comprising:
a location sensor and a data sensor for collecting data that relates to technical equipment that is part of a facility;
an area component configured to determine that the mobile device is located in an event area with a potential of occurrence of events in event categories, wherein the event area is a geographic area within the facility inside which the events originate from the technical equipment, wherein the event categories relate to one or more of: an emission of gas above a threshold, an absence of a particular piece of equipment, or an emission of sound within a given frequency range or in repetitions with time intervals of a predefined duration;
a detection component configured to process data from the data sensor that is indicative of at least one event that falls into at least one of the event categories, the detection component being active if the mobile device is located in the event area, wherein an event is indicative of a risk or non-compliance with a rule; and
a recorder component configured to record data from the data sensor of the mobile device in combination with a geographic location of the mobile device, the recorder component being active if at least one event that falls into at least one of the event categories has been detected, wherein data is recorded based on a proximity range of the mobile device so that if the mobile device and the technical equipment are positioned in relation to each other outside the proximity range the recording is avoided, with the proximity range being a function of the at least one event category for which the detection component is activated, or being determined by data resolution in combination with a distance from the data sensor to the technical equipment or by a signal-to-noise ratio of the data sensor.

17. The mobile device according to claim 16, wherein the location sensor is configured to utilize at least one of a satellite positioning system, a triangulation method, and a network node proximity approach.

18. The mobile device according to claim 16, wherein the data sensor is implemented as an on-board data collector selected from the group of: acoustic sensor, chemical sensor, visual sensor, vibration sensor, user interface element.

19. The mobile device according to claim 16, wherein
the data sensor is implemented as a directional sensor.

20. A non-transitory computer-readable recording medium having a computer program recorded thereon that causes at least one processor of a mobile device to implement a method for collecting a data set that relates to safety and security of technical equipment, the mobile device including a location sensor and a data sensor, the method comprising:
determining that the mobile device is located in an event area being a geographic area of the facility inside which events originate from the technical equipment in event categories, wherein the event categories relate to one or more of: an emission of gas above a threshold, an absence of a particular piece of equipment, or an emission of sound within a given frequency range or in repetitions with time intervals of a predefined duration;

activating a detection component in the mobile device, the detection component being configured to process data from the data sensor to detect at least one event that falls into at least one of the event categories, wherein an event is indicative of a risk or non-compliance with a rule; and upon detecting the at least one event that falls into at least one of the event categories, providing a data set to a second processor with data from the data sensor of the mobile device in combination with the geographic location of the mobile device from the location sensor for recording of the data set, wherein the providing of the data set depends on a proximity range of the mobile device so that if the mobile device and the technical equipment are positioned in relation to each other outside the proximity range the recording is avoided, with the proximity range being a function of the event category for which the detection component is activated, or being determined by data resolution in combination with a distance from the data sensor to the technical equipment or by a signal-to-noise ratio of the data sensor.

* * * * *